United States Patent [19]

Livingston

[11] Patent Number: 5,725,228
[45] Date of Patent: Mar. 10, 1998

[54] TRAILERABLE RECREATIONAL VEHICLES AND WATERCRAFT WITH REAR LIGHTS FOR SAFE TOWING ON A TRAILER

[76] Inventor: David T. Livingston, 4445-54th SW., Seattle, Wash. 98116

[21] Appl. No.: 654,336

[22] Filed: May 28, 1996

[51] Int. Cl.$^6$ .................................................. B60G 1/26
[52] U.S. Cl. ...................... 280/414.1; 280/422; 340/472; 340/479; 362/80
[58] Field of Search ........................ 280/414.1, 420, 280/422; 362/80, 233; 114/344; 340/472, 475, 479

[56] References Cited

U.S. PATENT DOCUMENTS

| | | | |
|---|---|---|---|
| 3,885,146 | 5/1975 | Whitley, Jr. | 280/414.1 |
| 4,017,136 | 4/1977 | Sasgen | 280/422 |
| 4,286,309 | 8/1981 | Rasinski | 280/414.1 |
| 4,613,927 | 9/1986 | Brandt | 362/80 |
| 4,859,982 | 8/1989 | Seaburg | 340/475 |
| 5,055,983 | 10/1991 | Hunold et al. | 362/80 |
| 5,073,768 | 12/1991 | Willaredt | 340/472 |
| 5,636,916 | 6/1997 | Sokolowski | 362/80 |

OTHER PUBLICATIONS

Yamaha WaveRunner® Brochure, Yamaha Motor Corporation, USA LIT–18119–10–96, 1995.
Yamaha Snowmobile Brochure, Yamaha Motor Corporation, U.S.A., LIT–12118–01–96, 1995.
Yamaha ATV Brochure, Yamaha Motor Corporation, U.S.A., LIT–11111–11–96.
Honda Motorcycles, ATVs, and Scooters Brochure, America Honda Motor Co., Inc. 1995.

*Primary Examiner*—Scott Cummings
*Attorney, Agent, or Firm*—Christensen O'Connor Johnson & Kindness

[57] ABSTRACT

A recreational personal trailerable vehicle, such as a boat, is provided with a rear brake light. The boat; boat electrical harness, and trailer combination is safer for being towed in traffic. The boat includes a rear-mounted brake light, located in the stern of the boat, activated in concert with the brake lights of a motorized towing vehicle, to warn following motorists that the boat and trailer combination is slowing down. Further, the electrical cable supplying power to the rear brake light is concealed, providing an aesthetically pleasing appearance to the boat. An electrical harness is connected to a power supply on the motorized vehicle and supplies power to both the rear brake light of the boat, and a pair of spaced rear-mounted brake lights of the trailer. Optionally, the rear lights are activated by a transmitter-receiver arrangement that activates a power source electrically connected to the rear light.

16 Claims, 1 Drawing Sheet

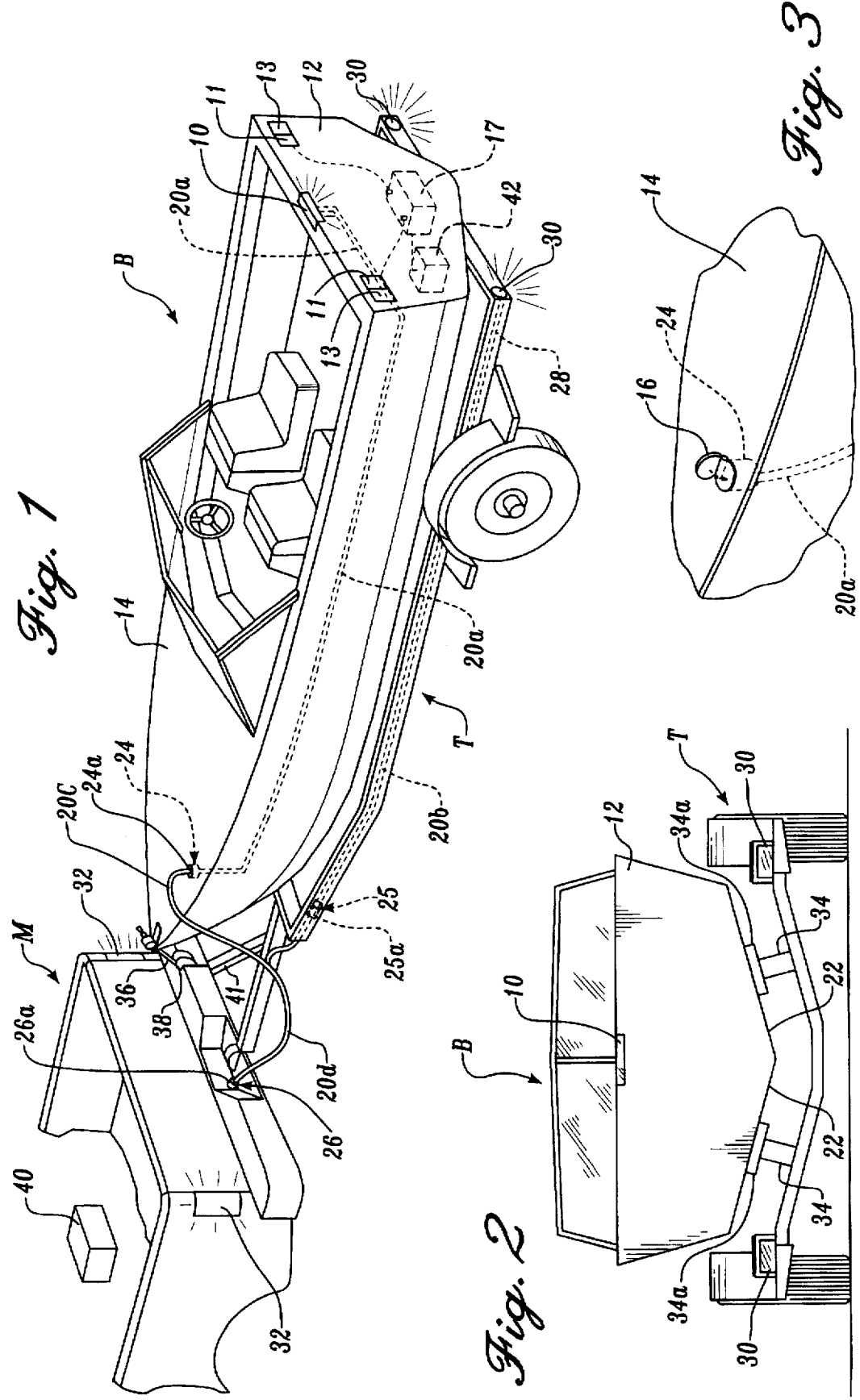

TRAILERABLE RECREATIONAL VEHICLES AND WATERCRAFT WITH REAR LIGHTS FOR SAFE TOWING ON A TRAILER

FIELD OF THE INVENTION

The invention relates to the improvement of the safety of towing of watercraft and recreational vehicles such as all-terrain vehicles, snowmobiles, and the like when mounted on wheeled trailers. More particularly, the invention provides such vehicles and watercraft with a rear mounted brake light (and optional turn signal and running lights) that is connected, through an electrical harness and an electrical cable concealed under structure of the vehicle or watercraft, to an electrical source on a motorized towing vehicle. In certain embodiments, the electrical harness is not required and the lights are remotely activated and powered by an onboard battery.

BACKGROUND OF THE INVENTION

In recent years, in an effort to decrease the number of rear end collisions on highways and roads, the United States Department of Transportation has required that all new vehicles be fitted with an additional brake light mounted at such a height that it would be more readily visible to a following vehicle, than the usual lower mounted taillights. On some cars these high mounted brake lights are mounted against the rear window inside the passenger compartment, and in others the taillight is mounted on an upper portion of the trunk or a spoiler extending above the trunk.

This requirement does not apply to trailers used for towing watercraft such as boats, Jetskis®, SeaDoos™ and other recreational vehicles such as snowmobiles, and "all-terrain" vehicles. However, when a following driver collides with the rear end of such a trailer, there is a similar risk of both property damage and personal injury. Nevertheless, trailer designs merely incorporate a pair of rear brake lights located fairly low on the trailer, often close to ground level to allow ease of mounting the watercraft or vehicle on the trailer, and ease of removing the same from the trailer. These rear brake lights are usually powered by electricity carried by an electrical cable that is coupled to a power source on the motorized towing vehicle. Usually, the brake lights of the trailer are connected to operate in concert with the brake lights of the vehicle. Thus, when brakes are applied, the brake lights of the vehicle and the trailer light up simultaneously. However, the lights of the towing vehicle are normally obscured by the watercraft or vehicle and trailer, so that they are not usually readily apparent to a following driver. On the other hand, as explained above, the brake lights of the trailer are located at a lower position on the trailer and are not nearly as visible as the high mounted brake lights required on automobiles.

There exists a need for a device that will more apparently and clearly warn a driver following a trailered watercraft or other vehicle that brakes have been applied, and that the trailer is slowing down, than the present low-mounted tail lights. Such a device should be inexpensive, easy to operate, robust, and should not affect the utility of either the trailer or the watercraft or vehicle it is carrying. Thus, the ease of loading onto the trailer, and offloading from the trailer should not be adversely affected.

SUMMARY OF THE INVENTION

The invention provides recreational vehicles and recreational watercraft; and a combination of either of these with a wheeled trailer, that is safer for being towed in traffic. The recreational vehicle or watercraft of the invention is unique in that it has an integrated rear mounted brake light, facing toward the rear of the vehicle. The light is preferably at about eye-level for a following motorist when the vehicle or watercraft is mounted on a trailer. When brakes are applied to the motorized towing vehicle, the brake light is activated and lights up in concert with the brake lights of the towing vehicle and the trailer to warn following motorists. Moreover, the invention also provides optional rear-mounted turn indicator lights and running lights to further enhance the safety of the trailered vehicle or watercraft.

In accordance with the invention, the term "trailerable recreational vehicle" (TRV) includes, but is not limited to watercraft, such as boats, Jetskis®, personal watercraft such as Waverunners®, Seadoos™, and the like, and wheeled, sledded, or tracked vehicles such as snowmobiles, off road all-terrain vehicles, such as "ATV's", and the like, all of which are usually transported on a trailer to a destination for use or storage. For ease of description, reference may be made primarily to boats, but the invention applies to all types of trailerable recreational vehicles.

In one embodiment, the rear mounted brake light of the trailerable recreational vehicle exemplified as a boat for ease of explanation is connected to a concealed electrical cable that extends from the integrated brake light, along the length of the boat, to a position near the stem of the boat. At this point, the cable terminates in an electrical connector that extends through a portion of the upper deck, or any other superstructure of the boat. Preferably, the connector end is recessed in the boat superstructure so that it may be covered with a cover that is coextensive with the boat superstructure's surrounding surface, when the connector is not is use. When in use, the cover is lifted or unscrewed and a cooperating of an electrical harness is electrically coupled to the connector to supply power to the rear light.

In the trailerable recreational vehicle and trailer combination of the invention, the electrical harness for carrying electrical power is Y-shaped having a length of common cable with two separate cables branching out from the common cable. The harness therefore has three terminal ends, each supplied with an electrical connector. The end of the common cable has a connector adapted for connection to a power source on the motorized towing vehicle. As indicated above, one separate cable length of the harness has another connector adapted for supplying power to the rear light of the boat. The other cable length of the harness has a connector for attaching to a cooperating connector on a cable that extends along the trailer to supply electricity to the taillights mounted at the rear of the trailer. Thus, in the case of a boat with rear mounted brake light, the trailer, and the electrical harness form a combination that significantly enhances the safety of towing boats along busy highways and other roads, reducing the risk of rear end collisions.

In an alternative embodiment, a receiver-transmitter system is used in accordance with the invention to detect and transmit a signal that the motorized towing vehicles' rear light (brake or turn signal) has been activated, to a receiver on the TRV mounted on the trailer. The receiver activates a power source that is in electrical communication with the rear light of the TRV. For running lights, the power source, such as a battery, may become exhausted during long trips. Thus, in accordance with the invention, the above-described electrical harness may be used to power the running lights, while the receiver-transmitter system is used to activate brake lights and turn signal indicators.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a schematic perspective view of an embodiment of the invention illustrating a boat mounted on a trailer being towed by a motorized vehicle (partial view);

FIG. 2 is a rear view of the boat mounted on the trailer, as shown in FIG. 1; and FIG. 3 is an enlarged view of a terminal end of a concealed cable extending through superstructure of the boat.

DETAILED DESCRIPTION OF THE PREFERRED EMBODIMENT

The invention provides a trailerable recreational vehicle ("TRV") that can be towed on a wheeled trailer, and a TRV and trailer combination, that is safer for being towed in traffic. In particular, the TRV has a rear mounted brake light that is activated in concert with the brake lights of the trailer and the brake lights of the motorized towing vehicle to provide a warning to following motorists. In one aspect of the invention, the rear mounted brake light of the TRV is connected to a power source on the motorized vehicle through a concealed electrical cable extending, in the case of a boat, from the brake light to the vicinity of the bow of the boat where it terminates in an electrical connector that is adapted for connection to an electrical harness that has another end attached to a power source on the motorized towing vehicle. A cable of the harness extends along the length of the boat trailer and is electrically connected to the conventional rear mounted brake lights of the trailer so that these also operate in concert with the brake lights of the motorized towing vehicle, when brakes are applied. Other embodiments of the TRV's of the invention are similar, as described below.

The invention may be better understood with reference to the accompanying drawings, illustrating a preferred embodiment of the invention based on a boat. Clearly, other embodiments encompassed in the definition of a "TRV" (above) and others that may become apparent to a person of skill in the art upon reading this disclosure are also encompassed in the invention.

FIG. 1 shows a combination, in perspective view, of a TRV in the form of a boat B, trailer T, and motorized vehicle M, in accordance with the invention. The boat B has a brake light 10 mounted in the vicinity of the stern 12, preferably in a rearward facing surface of the stern, so that the light is visible to a following motorist, as shown in rear view FIG. 2. Preferably, the brake light is covered with a red transparent plastic cover. Optionally, the boat also has a pair of spaced running lights 11, on either side of the stern; and also turn indicator lights 13 mounted on either side of the stern. Preferably these lights are also covered with a colored (preferably red or amber) transparent cover.

A concealed electrical cable 20a extends from the brake light, and optional running and turn indicator lights, transversely across the stern of the boat to the side of the boat, and then extends along to the side of the boat towards the bow, where it terminates in an electrical connector 24. By "concealed" it is meant that the cable is not readily apparent to a viewer from outside the boat. As shown more clearly in FIG. 3, an upper end of electrical connector 24 extends through the superstructure of the boat B, in this instance through the foredeck 14. The electrical connector shown is coverable with a hinged cover 16, preferably the cover is a water-tight cover whether hinged or otherwise, to protect the electrical connection from water when the boat is under power in the water. The concealed electrical cable 20a, the recessed electrical connector 24, and the flush-mounted electrical connector cover 16, provide an aesthetically pleasing outward appearance, without detracting from the functional, utilitarian, feature of the rear mounted light. As will be explained below, a cable length 20c of an electrical harness H has an electrical connector adapted to couple with recessed electrical connector 24 to supply power to the rear brake light.

Optionally, the cable 20a is also in electrical communication with an onboard battery 17 of the boat so that power is supplied through the cable to recharge the battery, as required.

As shown in FIG. 1, the boat B is mounted on the trailer T, in conventional fashion. Thus, in the illustrative embodiment, the lower portion of the hull of the boat 22 rests on and support longitudinally extending support members 34a, one on either side of the hull. The support members are angled so that their upper surfaces contact and support the hull of the boat. Each of the members 34a is supported by at least a pair of support brackets 34 extending upward from the frame of the trailer T, one bracket near the front end of the trailer, and the other near the rear end of the trailer. Moreover, the boat is held in place on the trailer by a tensioned cable 36 extending from a point of connection near the tip of the bow, around a pulley 38 rotatably mounted to a bracket 41 that extends upwardly to near the tip of the bow from a forward end of the trailer.

A Y-shaped electrical harness H, including a common cable length 20d and two separate lengths of cable 20c, 20e, branching from the common cable, supplies electrical power from a power source on the motorized vehicle to the boat and trailer brake lights. The common cable length 20d terminates in a connector 26 that is adapted for attachment to a cooperating electrical connector 26a on the motorized towing vehicle that supplies power. The first branch 20c of the Y-shaped harness extends from the common cable length 20d and has a connector 24a at its terminal end for cooperating with electrical connector 24 at the terminal end of the concealed cable 28 of the boat. Thus, electrical communication is established from the power source on the motorized vehicle, through connectors 26, 26a, common cable 20d, through cable 20c, concealed cable 20a, to the rear brake light 10 of the boat, and also to the optional rear running lights, turn signal lights and onboard battery. Similarly, the other branch 20e of the electrical harness extends from the Y-shaped junction to a connector 25a at its terminal end. This connector 25a cooperates with an electrical connector 25 at the terminal end of cable 20b, near the front of the trailer. As a result, electrical communication is established from the power source on the motorized vehicle, through connectors 26, 26a, common cable length 20d, cable length 20e, trailer cable length 20b, to the brake lights 30 of the trailer. According to the invention, the rear light 10 of the boat and the rear lights 30 of the trailer are in electrical communication with the electrical circuit of the braking system of the motorized vehicle so that when brakes are applied, and the brake lights 32 of the motorized vehicle are activated, then the brake light 10 of the boat and the brake lights 30 of the trailer are activated simultaneously.

In an alternative embodiment, also shown in FIG. 1, a Y-shaped harness is not required and the rear lights 10 are activated by a signal from a transmitter 40 to a receiver 42 electrically connected to a power supply 17 in communication with the lights. Thus, as the motorized towing vehicle brakes (or its turn signals are activated) this is detected and a signal is transmitted to the receiver to activate the rear brake light of the TRV, in this case a boat (or its turn signals 13). The running lights 12 are activated when the headlights of the towing vehicle are activated. This is also effected by detection of the activation of the headlights and a signal from the transmitter to the receiver that activates the circuit from the battery 17 to the lights. The running lights of the trailer may also optionally be conventionally operated through electrical cable-connection, as shown and explained above.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A trailerable recreational vehicle comprising:
    (a) at least one electrically-powered rear light, the light mounted on a surface of the vehicle and facing rearward when the light is powered;
    (b) a concealed electrical cable extending from the rear light along a length of the vehicle to a terminal end; and
    (c) an electrical connector at the terminal end of the cable, the connector allowing connection to an electrical power supply so that said at least one rear light is powered in concert with lights of a towing vehicle.

2. The vehicle of claim 1, wherein the at least one electrically-powered rear light is covered with a red plastic transparent cover.

3. The vehicle of claim 1, wherein the vehicle is a watercraft and the electrical connector is recessed in the foredeck of the watercraft.

4. The vehicle of claim 3, wherein the electrical connector is equipped with a water-tight cover for use when the watercraft floats in water.

5. The vehicle of claim 3, wherein the rear light is mounted on a rearward facing surface of the watercraft.

6. A trailerable recreational vehicle and trailer combination, the combination comprising:
    (a) a trailerable recreational vehicle comprising:
        (i) at least one electrically-powered rear light, the light mounted in the vicinity of the rear of the vehicle so that light shines rearward when the light is powered;
        (ii) a concealed electrical cable extending from the light to a terminal end;
        (iii) a terminal electrical connector at the terminal end of the concealed cable, the terminal connector adapter for allowing connection to an electrical power supply;
    (b) a trailer for mounting the trailerable recreational vehicle thereon and transporting the vehicle on land, said trailer comprising:
        (i) at least one rear trailer brake light;
        (ii) an electrical cable extending from the at least one rear trailer brake light of the trailer along a length of the trailer to terminate in a trailer electrical connector at a forward end of the trailer, the trailer electrical connector adapted for receiving power from a supply of electrical power; and
    (c) a Y-shaped harness for carrying electrical power from a power source to the rear lights of the trailer and the vehicle, the harness comprising: a first common cable, the cable extending from a first end having a first connector adapted for connection to a power source to a second end branching into second and third cable lengths; the second cable length in electrical communication with the first connector of the common cable, the second cable having a second connector at an end thereof, the second connector adapted for connection to the trailer electrical connector at the forward end of the trailer; and the third cable length in electrical communication with the first connector of the common cable, the third cable having a connector at an end thereof adapted for connection to the terminal connector at the terminal end of the concealed cable of the vehicle.

7. The vehicle and trailer combination of claim 6, wherein the vehicle is a boat and the at least one electrically-powered light of the boat is covered with a red plastic transparent cover.

8. The vehicle and trailer combination of claim 7, wherein the terminal electrical connector at the terminal end of the concealed cable is recessed in a foredeck of the boat and is equipped with a water-tight cover for use when the boat floats in water.

9. The vehicle and trailer combination of claim 7, wherein the at least one electrically-powered rear light of the boat is mounted on a rearward facing surface of the stem of the boat.

10. The vehicle and trailer combination of claim 6, wherein the electrical harness for carrying electrical power is adapted to carry power when brakes are applied in a towing vehicle so that the at least one rear light of the vehicle and the at least one rear light of the trailer operate in concert with brake lights of the towing vehicle.

11. A trailerable recreational vehicle, trailer, and towing vehicle combination comprising:
    (a) a trailerable recreational vehicle having at least one electrically-powered rear light, the light mounted on a surface of the trailerable recreational vehicle and facing rearward when the light is powered, the recreational vehicle having a receiver mounted thereon, the receiver in communication with a power source; the power source in electrical communication with the at least one rear light;
    (b) a trailer, the trailerable recreational vehicle mounted thereon for transportation; and
    (c) a towing vehicle for towing the trailer, the towing vehicle having a transmitter mounted thereon, the transmitter transmitting a signal to the receiver mounted on the trailerable recreational vehicle.

12. The combination of claim 11, wherein the at least one electrically-powered rear light comprises a brake light.

13. The combination of claim 11, wherein the trailerable recreational vehicle is a watercraft.

14. The combination of claim 13, wherein the at least one rear light comprises turn signal indicator lights.

15. The combination of claim 11, further comprising an electrical cable supplying power from a power source mounted on the towing vehicle to the at least one rear light of the trailerable recreational vehicle.

16. The combination of claim 15, wherein the at least one rear light comprises a running light in electrical communication with the electrical cable.

* * * * *

UNITED STATES PATENT AND TRADEMARK OFFICE
CERTIFICATE OF CORRECTION

PATENT NO.  : 5,725,228
DATED       : March 10, 1998
INVENTOR(S) : D.T. Livingston It is certified that error appears in the above-identified patent and that said Letters Patent is hereby corrected as shown below:

| COLUMN | LINE | |
|---|---|---|
| Title Page | Primary Examiner | after "Scott" insert --W.-- |
| 6 (Claim 9, | 25 line 3) | "stem" should read --stern-- |

Signed and Sealed this

Ninth Day of June, 1998

Attest:

BRUCE LEHMAN

Attesting Officer

Commissioner of Patents and Trademarks